United States Patent

[11] 3,625,918

[72] Inventors Alfred Heer
 Basel;
 Peter Ruf, Binningen, both of Switzerland
[21] Appl. No. 737,833
[22] Filed June 18, 1968
[45] Patented Dec. 7, 1971
[73] Assignee Ciba Limited
 Basel, Switzerland
[32] Priority June 22, 1967
[33] Switzerland
[31] 8944/67

[54] ADDUCTS OF POLYEPOXIDES AND CYCLOALIPHATIC DIPRIMARY DIAMINES AND AS CURING AGENTS IN EPOXY RESIN COMPOSITIONS
10 Claims, No Drawings

[52] U.S. Cl. .................................................. 260/47 EN,
 117/161 ZB, 161/184 R, 260/37 EP, 260/2 EP,
 260/59 R, 260/77.5 R, 260/89.1 R, 260/93.5 A,
 260/94.2 R, 260/830 TW
[51] Int. Cl. ....................................................... C08g 30/14
[50] Field of Search ........................................... 260/2 EP,
 88.3 A, 47 EP CN, 59, 830 TW, 18 EP

[56] References Cited
UNITED STATES PATENTS

| | | | |
|---|---|---|---|
| 2,897,179 | 7/1959 | Shechter et al. | 260/47 EPCN |
| 3,029,286 | 4/1962 | Bressler et al. | 260/2 EPCN |
| 3,366,600 | 1/1968 | Haberlin et al. | 260/47 EPCN |
| 3,483,168 | 12/1969 | Forster et al. | 260/2 EPCN |

Primary Examiner—William H. Short
Assistant Examiner—T. Pertilla
Attorneys—Harry Goldsmith, Joseph G. Kolodny, Bryant W. Brennan and Edward J. Sites ABSTRACT: Process for the manufacture of new adducts of polyepoxides and polyamines suitable for use as curing agents for epoxy resins characterized in that (1) a 1,2-polyepoxide compound is reacted with (2) a cycloaliphatic-aliphatic diprimary diamine in which the first primary amino group is located on an aliphatic side-chain and the second primary amino group is bonded to an endocyclic carbon atom of the cycloaliphatic ring, in a quantity ratio of 0.6 to 1.2 mols, preferably 0.7 to 1.0 mols, of the diamine (2) per 1 epoxide equivalent of the polyepoxide compound (1), with heating.

ADDUCTS OF POLYEPOXIDES AND CYCLOALIPHATIC DIPRIMARY DIAMINES AND AS CURING AGENTS IN EPOXY RESIN COMPOSITIONS

It is known, for example from British Pat. Specification 691,543and German Pat. Specification 976,833 that adducts can be manufactured from solutions of aliphatic polyamines and solutions of solid epoxide resins in organic solvents, with one epoxide equivalent of a polyepoxide or epoxy resin being added to at least 1.8 equivalents of an aliphatic polyamine and the materials being allowed to react with one another, with heating. After removing the solvent and the unreacted excess polyamine, resin-like adducts which are solid at room temperature are obtained. These known solid isolated adducts are dissolved in organic solvents and are, as required, mixed with solutions of epoxy resins to form ready-to-use lacquer products.

The use of such adducts as curing agents instead of the aliphatic polyamines, employed for the adduct formation, as such produces a series of advantages: the adducts are less volatile and physiologically safer in use, and the lacquer films produced are less moisture-sensitive. At the same time the manufacture of such solid adducts is relatively delicate and involved, so that it is necessary to take special measures to avoid gelled constituents being produced in the reaction between the epoxide compound and the polyamine as a result of partial cross-linking. Furthermore, the process is generally carried out in a solvent (for example toluene or dioxane) and a considerable excess of polyamine, for example 1.5 to 1.8 mols per epoxide equivalent of the epoxy resin, is employed. After completion of the reaction the solvent and the unreacted polyamine must be distilled off. If water-soluble solvents (for example dioxane) are used the adduct can also be separated off by pouring the reaction mixture into water. Despite using an excess of polyamine, the adducts thus manufactured, after removal of the excess polyamine, only contain about 0.8 mol of added polyamine per epoxy equivalent, since a part of the polyamine does not react at a single amino group only; undesired higher-molecular sparingly soluble adducts are thereby produced.

Since these known adducts of epoxy resins and aliphatic polyamines react both with epoxide resins and with aliphatic polyamines as such at room temperature, they cannot serve for the manufacture of storage-stable single-component systems, such as for example compression moulding compositions, sintering powders, "prepregs" and the like.

It is further proposed, in Austrian Pat. Specification 243,517, to manufacture solvent-free adducts of epoxy resins and polyaminoamides and/or polyamino-imidazolines. Such adducts however suffer from the serious technical disadvantage that they are insufficiently reactive as curing agents for epoxide resins at low temperatures so that at lower temperatures the epoxy resin/adduct curing agent mixtures do not cure sufficiently. Despite this relatively low reactivity mixtures of such adducts and epoxy resins are not storage-stable at room temperature and for this reason the adducts mentioned are as little suited to the manufacture of single-component systems, such as for example compression moulding compositions as are the adducts of epoxide resins and aliphatic polyamines.

It has now surprisingly been found that on using certain cycloaliphatic-aliphatic diprimary diamines in which one of the amine groups is more reactive than the other, solid adducts which do not show the above-mentioned disadvantages preferably 0.7 to 1.0, mols of diamine per epoxide equivalent of the polyepoxide compound. In the adducts obtained essentially only the primary amino group located on the aliphatic side-chain is reacted while the primary amino group located on the cycloaliphatic ring has essentially not reacted.

The subject of the present invention are thus new adducts suitable for use as curing agents for epoxy resins, of (1) a polyepoxide compound and (2) a cycloaliphatic-aliphatic diprimary diamine, in which the first primary amino group is located on an aliphatic side-chain and the second primary amino group is bonded to an endocyclic carbon atom of the cycloaliphatic ring, with 0.6 to 1.2, preferably 0.7 to 1.0, mols of the diamine (2) having been employed for the adduct formation per 1 epoxide equivalent of the polyglycidyl compound (1).

The new adducts are manufactured, in accordance with the invention, by reacting (1) a polyepoxide compound with (2) a cycloaliphatic-aliphatic diprimary diamine in which the first primary amino group is located on an aliphatic side-chain and the second primary amino group is bonded to an endocyclic carbon atom of the cycloaliphatic ring, in a quantity ratio of 0.6 to 1.2 mols, preferably 0.7 to 1.0 of the diamine (2) per 1 epoxide equivalent of the polyepoxide compound (1), with warming.

Possible polyepoxide compounds are, for example: Butadiene-diepoxide, divinylbenzene-diepoxide, epoxidised polybutadienes or copolymers of butadiene with ethylenically unsaturated compounds such as styrene or vinyl acetate; diglycidyl ethers and diglycidyl formal; and heterocyclic nitrogen compounds which are substituted by glycidyl groups at the nitrogen atoms, for example triglycidyl isocyanurate or N,N'-diglycidyl-5,5-dimethylhydantoin.

Further possible materials are polyglycidyl esters such as are accessible by reaction of a dicarboxylic acid or tricarboxylic acid with epichlorhydrin or dichlorhydrin in the presence of alkali. Such polyesters may be derived from aliphatic dicarboxylic acids such as succinic acid or adipic acid and especially from aromatic or hydroaromatic dicarboxylic acids, such as phthalic acid, terephthalic acid, tetrahydrophthalic acid or hexahydrophthalic acid. Diglycidyl adipate, diglycidyl phthalate, diglycidyl tetrahydrophthalate, diglycidyl hexahydrophthalate and diglycidyl isophthalate may for example be mentioned.

A preferentially used class of polyepoxide compounds are polyglycidyl ethers such as are accessible by etherification of a dihydric or polyhydric alcohol or diphenol or polyphenol with epichlorhydrin or dichlorhydrin in the presence of alkali. These compounds may be derived from glycols such as ethylene glycol, diethylene glycol, triethylene glycol, 1,3-propylene glycol, 1,4-butanediol, 1,5-pentanediol, 1,6-hexanediol, 2,4,6-hexanetriol or glycerine, and especially from diphenols or polyphenols such as resorcinol, pyrocatechol, hydroquinone, phenolphthaleine, phenol-formaldehyde condensation products of the Novolac type, 1,4-dihydroxynaphthaline, bis(p-hydroxyphenyl) methane, bis(p-hydroxyphenyl)-methylphenylmethane, bis(p-hydroxyphenyl) tolylmethane, 4,4-dihydroxy-diphenyl, bis(p-hydroxyphenyl) sulfone and especially bis(p-hydroxyphenyl)dimethylmethane.

The polyglycidyl ethers of bis(p-hydroxyphenyl)dimethylmethane (bisphenol A), which correspond to the average formula (I) 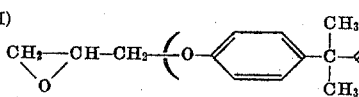 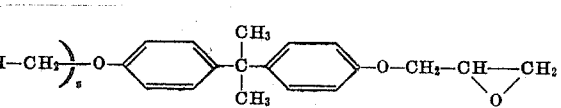

of the known adducts can be obtained in a very simple manner by reaction with polyepoxide compounds. Suitable diamines are those in which one amino group is positioned on the aliphatic side-chain while the other is directly positioned on the cycloaliphatic ring. The quantity ratios between the diprimary cycloaliphatic-aliphatic diamines on the one hand and the polyepoxide compound on the other hand are 0.6 to 1.2, wherein z denotes an integral or fractional small number having a value of 0 to 4 may especially be mentioned.

Alicyclic polyepoxides are particularly preferentially used as the polyepoxide compound for the manufacture of the adducts according to the invention. Curable mixtures of epoxy resins with such adducts as a rule yield shaped articles having particularly good electrical properties. As alicyclic polyepoxide there may be mentioned: Vinylcyclohexene diepoxide, limonene diepoxide, dicyclopentadiene diepoxide, ethylene glycol-bis(3,4-epoxytetrahydroicyclopentadien-8-yl) ether, (3,4-epoxytetrahydrodicyclopentadien-8-yl)-glycidyl ether, compounds having two epoxycyclohexyl residues such as diethylene glycol-bis-(3,4-epoxycyclohexanecarboxylate bis-3,4-(epoxycyclohexymethyl)-succinate, 3,9-bis(3,4-epoxycychohexyl) spirobi (meta-dioxane), as well as those of general formula (II) 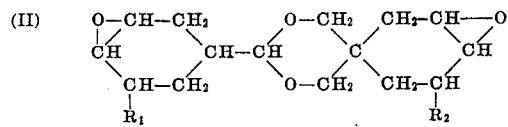

or those of formula (III) 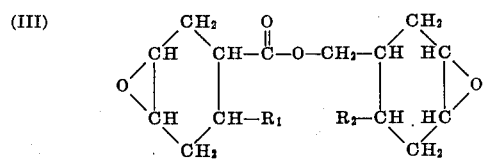

wherein the residues $R_1$ and $R_2$ in formulas (II) or (III) represent hydrogen atoms or methyl groups such as for example 3,4-epoxy-6-methylcyclohexylmethyl-3,4-epoxy-6-methyl-cyclohexanecarboxylate and 3,4-epoxyhexahydrobenzal3,4-epoxycyclohexane-1,1-dimenthanol.

It is furthermore possible to use mixtures of two or more of the polyepoxide compounds listed above. As cycloaliphatic-aliphatic diprimary diamines which are suitable for the manufacture of the adducts according to the invention there may for example be mentioned: 1,8-diamino-p-menthane of formula (IV) 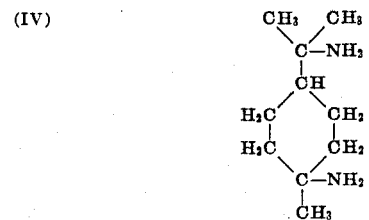

2-aminomethyl-cyclopentylamine of formula (V) 

as well as diamines of general formula (VI) 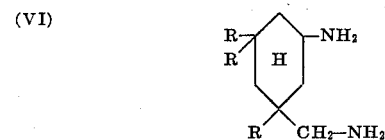

(R=identical or different alkyl groups), such as especially 3(aminomethyl)-3,5,5-trimethyl-1-cyclohexylamine. The use of curable mixtures of epoxy resins and 3-(aminomethyl)-3,5,5-trimethyl-1-cyclohexylamine or 1,8-diamino-p-menthane for the manufacture of cast articles, or in the surface protection field, is described in German Published Specification 1,236,195. Such curable mixtures are not storage-stable. It must be regarded as extremely surprising that the new adducts according to the invention, when mixed with epoxide resins, yield single-component systems of good storage stability since the expert would have had to expect the opposite from the known fact that mixtures of epoxide resins and adducts of polyepoxide compounds to aliphatic polyamines have as little storage stability as have mixtures of epoxide resins and aliphatic polyamines as such.

The manufacture of the new adducts according to the invention is preferably carried out by initially introducing the polyamine and allowing the epoxide compound to run in at 60° to 180° C., depending on the reactivity of the components, with cooling. Solid epoxide resins are allowed to run in as concentrated solutions in toluene or dioxane and the solvent is distilled off during or after the reaction. Surprisingly, soluble adducts, which are free of gelled constituents, are still obtained even on reacting only 0.7 mol of polyamine per equivalent of epoxide resin. When using less than 1 mol of polyamine per equivalent of epoxide resin the adducts manufactured according to the invention do not contain any free amine. Distilling off excess polyamine, as in the processes hitherto known, is hence no longer necessary.

Further additives, for example cure accelerators such as phenols or polyphenols may be added to the adduct curing agent according to the invention, as required.

The polyepoxide/amine adducts manufactured in accordance with the invention without a significant excess of amine, which as a rule are solid, can become of their solubility in the solvents mainly considered for epoxy resins, and because of their compatibility with the usual epoxy resins, be advantageously employed in all cases Where it is important to have uniformity of the films, coatings or shaped articles produced with the aid of the epoxy resin/curing agent mixtures, or where a solid curing agent having a softening point of between 50° and 150° C. is needed. In contrast to the solid adducts based on polyalkylene polyamines, such as diethylene triamine, and bisphenol-A polyglycidyl ethers, which are for example known from British Pat. Specification 691,543, the adducts manufactured according to the invention are excellently suited for use as curing agents in storage-stable single-component systems (for example for compression moulding compositions, especially low pressure compression moulding compositions, fluidized bed sintering powders, "prepregs" for laminates).

In order to manufacture curable mixtures from the new adducts according to the invention and epoxy resins, the adducts may be mixed, according to known methods, with an equivalent proportion of a known epoxy resin. Possible resins are, in principle, the same polyepoxide compounds which have been mentioned above as starting substances for the manufacture of the adducts. For the manufacture of single-component systems such as compression moulding compositions, there may especially be mentioned the polyglycidyl ethers of polyphenols such as bisphenol A or Novolacs, and also polyglycidyl ethers and polyglycidyl esters of phenolphthalein, triglycidyl isocyanurate as well as cyclic acetals of 1 mol of a polyol containing at least 4 hydroxyl groups and 2 to 3 mols of 3,4-epoxyhexahydrobenzaldehyde or 6-methyl-3,4-aepoxy-hexahydrobenzaldehyde, for example 3,9-bis(3,4-epoxycyclohexyl)spirobi(meta-dioxane) or bis(3,4-epoxyhexahydrobenzal)sorbitol.

The curable systems of the adducts according to the invention and epoxy resins may contain further usual additives such as organic solvents, fillers, pigments, dyestuffs and plasticizers. Apart from serving as compression moulding compositions, sintering powders and laminating resins ("prepregs") they may especially also serve as lacquers and coating materials, and furthermore as adhesives, impregnating resins, dipping resins and casting resins, especially in electrotechnology.

In the examples which follow, the percentages denote percentages by weight. The abbreviation Kp stands for Kiloponds. The following polyepoxide compounds I to XII were used as starting substances for the manufacture of adducts described in the examples.

I. a bisphenol-A polyglycidyl ether which is liquid at room temperature, manufactured by condensation of epichlorhydrin with bisphenol A [2,2-bis(p-hydroxyphenyl) propane] in the presence of alkali, having the following characteristics:
Epoxy equivalents per kg. = 5.35
viscosity according to Hoeppler = 9,500 c.p. (25° C.)

II. A bisphenol-A polyglycidyl ether which is liquid at room temperature, manufactured by condensation of epichlorhydrin with bisphenol A [2,2-bis-(p-hydroxyphenyl)-propane] in the presence of alkali, having the following characteristics:
Epoxy equivalents per kg. =5.5
Viscosity according to Hoeppler = apprsx. 5800 c.p. (25° C.).

A bisphenol-A polyglycidyl ether which is solid at room temperature, manufactured by condensation of epichlorhydrin with bisphenol A in the presence of alkali, having the following characteristics:
Epoxy equivalents per kg. =2.75
Softening point (Durran) = C.

IV. A bisphenol-A polyglycidyl ether which is solid at room temperature, manufactured by condensation of epichlorhydrin with bisphenol A in the presence of alkali, having the following characteristics:
Epoxy equivalents per kg. =
Softening point (Durran) =C.

V. Vinylcyclohexene diepoxide of formula

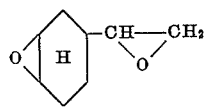

having an epoxide content of 13.2 epoxide equivalents per kg.

VI. Solid, cycloaliphatic diepoxide of formula

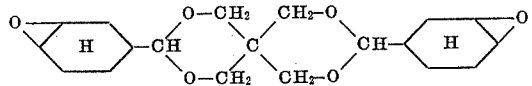

having the following characteristics:
Epoxide equivalents per kg. =
Softening point = less than 50° C.

VII. A cycloaliphatic diepoxide which is liquid at room temperature, of formula

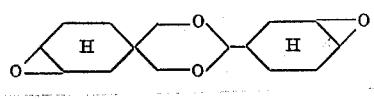

having the following characteristics:
Epoxy equivalents per kg. =6.2
Viscosity according to Hoeppler = approx. 280 c.p. at 75° C.

VIII. Triglycidyl isocyanurate having the following characteristics:
Epoxy equivalents per kg. =10.0
Melting range = to 115° C.

IX. Δ⁴-tetrahydrophthalic acid diglycidyl ester having the following characteristics:
Epoxy equivalents per kg. =
Viscosity (Hoeppler): =c.p. (25° C.).

X. 1,4-butanediol diglycidyl ether having the following characteristics:
Epoxy equivalents per kg. =7.6
Viscosity (Hoeppler) =14 to 22 c.p. (20° C.).

XI. A phenolphthalein polyglycidyl ether which is solid at room temperature, manufactured by condensation of epichlorhydrin with phenolphthalein in the presence of alkali, having the following characteristics:
Epoxy equivalents per kg. =
Softening point (Kofler bench) = approx. 50° C.

XII. A phenol-novolac polyglycidyl ether which is semisolid at room temperature, manufactured by condensation of epichlorhydrin with a phenol-novolac (softening point 52° to 54° C., molar ratio of phenol: Formaldehyde =2:1), having the following characteristics:
Epoxy equivalents per kg. =6.1
Softening point (Kofler bench) = less than 48° C.,

EXAMPLE 1

One hundred seventy grams (1.0 mol) of 3,5,5-trimethyl-3-(aminomethyl)-cyclohexylamine are initially introduced into a suitable apparatus and warmed to 80° C. under the nitrogen. one hundred eighty seven grams 1.0 equivalent) of liquid polyepoxide compound I are introduced while stirring and cooling in such a way that the temperature of the reaction mixture is 100° to 120° C. After completion of addition the mixture is stirred for a further 30 minutes at 110° to 115° C., discharged hot and allowed to cool under nitrogen. Three hundred fifty seven grams of adduct are obtained as a pale yellow solid resin having a softening point (Kofler bench) of 61° C. and an amine group content of 5.6 equivalents per kg. (determined by titration with perchloric acid in glacial acetic acid). The resulting adduct gives a clear solution in the usual solvents and is completely free of gelled constituents.

EXAMPLE 2

An adduct of 119 g. (0.7 mol) of 3,5,5-trimethyl-3-(aminomethyl)-cyclohexylamine and 187 g. (1.0 equivalent) of polyepoxide compound I is manufactured in the same manner as in example 1. Three hundred six grams of adduct are obtained as a pale yellow solid resin having a softening point (Kofler bench) of 92° C. and an amine group content of 4.55 equivalents per kg. One gram of this adduct gives a clear solution in 4 g. of ethylene glycol monomethyl ether. EXAMPLE 3

An adduct of 204 g. (1.2 mols) of 3,5,5-trimethyl3-(aminomethyl)-cyclohexylamine and 187 g. (1.0 equivalent) of polyepoxide compound I is manufactured in the same manner as in example 1. Three hundred ninety-one grams of adduct are obtained as a pale yellow solid resin having a softening point (Kofler bench) of about 45° C. and an amine group content of 6.1 equivalents per kg.

EXAMPLE 4

An adduct of 170 grams (1.0 mol) of 3,5,5,-trimethyl-3-(aminomethyl)-cyclohexylamine and 182 g. (1.0 equivalent) of polyepoxide compound II is manufactured in the same manner as in example 1. Three hundred fifty-two grams of adduct are obtained as a pale yellow solid resin having a softening point (Kofler bench) of 59° C. and an amine group content of 5.7 equivalents per kg.

Example 5

One hundred seventy grams (1.0 mol) of 3.5,5-trimethyl-3(aminomethyl)-cyclohexylamine are initially introduced into a suitable apparatus and warmed to 80° C. under nitrogen. While stirring and cooling, 364 g. of polyepoxide compound III dissolved in 243 g. of toluene are allowed to run in in such a way that the temperature of the reaction mixture is 110° to 115° C. After completion of addition the toluene is distilled off, firstly under normal pressure and then in vacuo up to an internal temperature of 120° C. at 20 mmHg. Five hundred thirty-four grams of adduct are obtained as a pale yellow solid resin having a softening point of 78° (Kofler bench) and an amine group content of 3.75 equivalents per kg.

EXAMPLE 6

An adduct is manufactured from 204 g. (1.2 mols) of 3,5,5-trimethyl3-(aminomethyl)-cyclohexylamine and 476 g. 1.0 equivalent) of polyepoxide compound IV, dissolved in 318 g. of toluene, in the same manner as in example 5. Six hundred eighty grams of adduct are obtained as a pale yellow solid resin having a softening point of 70° C. (Kofler bench) and an amine group content of 3.5 equivalents per kg.

EXAMPLE 7

An adduct is manufactured from 170 g. (1.0 mol) of 3,5,5-trimethyl-3-(aminomethyl)-cyclohexylamine and 476 g. (1.0 equivalent) of polyepoxide compound IV, dissolved in 318 g. of toluene, in the same manner as in example 5. Six hundred of adduct are obtained as a pale yellow solid resin having a softening point of 82° C. (Kofler bench) and an amine group content of —equivalents per kg.

EXAMPLE 8

One hundred forty grams (0.823 mol) of 3,5,5-trimethyl-31(aminomethyl)-cyclohexylamine are initially introduced into a suitable apparatus and warmed to 140° C. under nitrogen. While stirring and cooling, 76 g. (1.0 equivalent) of liquid polyepoxy compound V (= vinylcyclohexene diepoxide) are added dropwise in such a way that the temperature of the reaction mixture is 145° to 155° C. After completion of addition the mixture is stirred for a further 30 minutes at 155° C., and the reaction product is discharged hot and allowed to cool under nitrogen. Two hundred sixteen grams of adduct are obtained as a pale yellow solid resin having a softening point of 70° C. and an amine group content of 7.55 equivalents per kg.

EXAMPLE 9

An adduct is manufactured from 170 g. (1.0 mol) of 3,5,5-trimethyl-3-(aminomethyl)-cyclohexylamine and 76 g. (1.0 equivalent) of polyepoxide compound V in the same manner as in example 8. Two hundred forty-six grams of adduct are obtained as a pale yellow solid resin having a softening point of 50° C. and an amine group content of 8.1 equivalents per kg.

EXAMPLE 10

One hundred seventy grams (1.0 mol) of 3,5,5,-trimethyl-3-(aminomethyl-cyclohexylamine are initially introduced into a suitable apparatus and warmed to 145° C. While stirring and cooling, 228 g. of cycloaliphatic polyepoxide compound VI, prewarmed to 100° C., are allowed to run in from an electrically heated supply vessel in such a way that the temperature of the reaction mixture is 160° to 165° C. After completion of addition the mixture is stirred for a further 30 minutes at 165° to 170° C., and the reaction product is discharged hot and allowed to cool under nitrogen. Three hundred ninety-eight grams of adduct are obtained as a light yellow solid resin having a softening point of 120° C. and an amine group content of 5.0 equivalents per kg.

EXAMPLE 11

An adduct is manufactured from 170 g. (1.0 ) mol) of 3,5,5-trimethyl-3-(aminomethyl)-cyclohexylamine and 162 parts by weight (1.0 equivalent) of cycloaliphatic polyepoxide compound VII in the same manner as in example 10. Three hundred thirty-two grams of adduct are obtained as a light yellow solid resin having a softening point of 101° C. (Kofler bench) and an amine group content of 6.0 equivalents per kg.

EXAMPLE 12

One hundred seventy grams (1.0 mol) of 3,5,5-trimethyl-3-(aminomethyl)-cyclohexylamine are initially introduced into a suitable apparatus and warmed to 80° C. While stirring and cooling, a hot solution of 100 g. (1.0 0equivalent) of triglycidyl isocyanurate (polyepoxide compound VIII) in 300 g. of dioxane is allowed to run in in such a way that the temperature is 100°– C. and that a part of the dioxane distills off continuously. After completion of addition the residual dioxane is removed in vacuo and the reaction product is discharged hot allowed to cool under nitrogen. The adduct should not be heated to above 110° C. since amide formation can take place at higher temperatures. Two hundred seventy grams of adduct are obtained as a yellow resin having a softening point of 78° C. and an amine group content of 7.2 equivalents per kg.

EXAMPLE 13

One hundred seventy grams (1.0 mol) of 3,5,5,-trimethyl-3-(aminomethyl)-cyclohexylamine are initially introduced into a suitable apparatus and warmed to 80° C. While stirring and cooling, 153 g. 1.0 equivalent) of $\Delta^4$-tetrahydrophthalic acid diglycidyl ester (polyepoxide compound IX) are allowed to run in in such a way that the reaction temperature is 90° to 95° C. After completion of addition the mixture is kept for a further 30 minutes at 95° C. and the reaction product is discharged hot and allowed to cool under nitrogen. Higher temperatures than those specified should be avoided and lead to amide formation. Three hundred twenty-three grams of adduct are obtained as a pale yellow solid resin having a softening point of less than 48° C. (Kolfer bench), an amine group content of 6.0 equivalents per kg. and an amide group content of less than 0.2 equivalents per kg.

EXAMPLE 14

An adduct is manufactured from 128 g. (0.75 mol) of 3,5,5-trimethyl-3-(aminomethyl)-cyclohexylamine and 132 g. 1.0 equivalent) of 1,4-butanediol diglycidyl ether (polyepoxy compound X) in the same manner as in example 1. An adduct is obtained in the form of a light yellow solid resin having a softening point of less than 48° C. (Kofler bench) and an amine group content of 5.75 equivalents per kg.

EXAMPLE 15

An adduct is manufactured from 170 g. (1.0 mol) of 3,5,5,-trimethyl-3-(aminomethyl)-cyclohexylamine and a solution of 235 g. (1.0 equivalent) of polyepoxide compound XI in 157 g. parts by weight of toluene, in the same manner as in example 5. Four hundred five grams g. of adduct are obtained as a light brown solid resin having a softening point of 100 ° C. (Kofler bench) and an amino group content of 5.0 equivalents per kg.

EXAMPLE 16

An adduct is manufactured from 187 g. (1.1 mols) of 3,5,5-trimethyl-3-(aminomethyl)-cyclohexylamine and a solution of 164 g. (1.0 equivalent) of polyepoxide compound XII in 110 parts by weight of toluene, in the same manner as in example 5. Three hundred fifty-one grams of adduct are obtained as a pale yellow resin having a softening point of 60° C. and an amine group content of 6.2 equivalents per kg.

EXAMPLE 17

An adduct is manufactured from 510 g. (3 mols) of 1,8-diamino-p-menthane and 561 g. (3 equivalents) of liquid polyepoxide compound I in the same manner as in example 1. One thousand seventy-one grams of adduct are obtained as a solid brown resin having a softening point of 64° C. and an amine group content of 5.4 equivalents per kg.

EXAMPLE 18

An adduct is manufactured from 510 g. (3 mols) of 1,8-diamino-p-mentane and 227 g. (3 equivalents) of vinyl-cyclohexene diepoxide (liquid polyepoxy compound V), in the same manner as in example 8. Seven hundred thirty-seven grams of adduct are obtained as a dark brown resin which is soft and sticky at room temperature and has an amine group content of 8.0 equivalents per kg.

EXAMPLE 19

An adduct is manufactured from 914 g. (8 mols) of 2-aminomethyl-cyclopentylamine and 1870 g. (10 equivalents) of liquid polyepoxide compound I in the same manner as in example 1. Two thousand seven hundred eighty-four grams of pale yellow solid adduct having a softening point (Kofler bench) of 65° C. and an amine group content of 5.7 equivalents per kg. are obtained. Four grams of this adduct are soluble in six grams of ethylene glycol monomethyl ether to give a clear solution; the solution is, without filtration, free of gelled constituents and has a color number of 1 (according to Gardner-Holdt). One hundred twenty-seven grams of this adduct can be employed for curing 1 epoxide equivalent of a polyepoxide compound.

EXAMPLE 20

An adduct is manufactured from 114.2 g. (1 mol) of 2-aminomethyl-cyclopentylamine and 187 g. (1 equivalent) of liquid polyepoxide compound I, in the same manner as in example 1. Hereupon 301 g. of pale yellow solid adduct having a softening point (Kofler bench) of 42°–45° C. and an amine group content of 6.6 equivalent per kg. are obtained. One hundred grams of this adduct can be employed for curing 1 epoxide equivalent of a polyepoxide compound.

EXAMPLE 21

An adduct is manufactured from 914 g. (8 mol) of 2-aminomethyl-cyclopentylamine and 760 g. (10 equivalents) of liquid polyepoxide compound V (= vinylcyclohexene diepoxide in the same manner as in example 8. The pale yellow solid adduct has a softening point (Kofler bench) of 56° C. and an amine group content of 9.5 equivalents per kg. Seventy-six grams of this adduct can be employed for curing 1 epoxide equivalent of a polyepoxide compound.

EXAMPLE 22

An adduct is manufactured from 137 g. (1.2 mol) of 2-aminomethyl-cyclopentylamine and 162 g. (1 equivalent) of cycloaliphatic polyepoxide compound VII in the same manner as in example 10. Two hundred ninety-nine grams of light yellow solid adduct having a softening point of 65° C. (Kofler bench) and an amine group content of 8.0 equivalents per kg. are obtained. Seventy-nine grams of this adduct can be employed for curing 1 epoxide equivalent of a polyepoxide compound.

EXAMPLE 23

The following substances (epoxy resin and curing agent first crushed to powders) are premixed for 15 minutes in a "KENWOOD" mixer: 500 g. of a solid phenolphthalein-polyglycidyl ether manufactured by condensation of phenolphthalein and epichlorhydrin in the presence of alkali, having an epoxide content of 4.25 epoxide equivalents per kg (epoxy resin XI), 250 g. of the adduct of 3,5,5-trimethyl-3-(aminomethyl)-cyclohexylamine and polyepoxide compound II described in example 4, 15 g. of zinc stearate, 370 g. of antimony trioxide, 630 g. of slate powder and 53 g. of color pigment. This premix is continuously mixed in a cokneader with a throughput of about 10 kg./hour at 60° C. to give a compression moulding composition. The doughy substance produced is, after cooling, granulated in a suitable manner. The compression moulding composition thus obtained was pressed under the following conditions: Pressing temperature=150° C; pressing pressure=12 kp./cm.$^2$; minimum pressing time at 150° C. =1½minutes.

The pressed articles had the following properties: Dimensional heat stability according to Martens
DIN 53'458(°C.) 118
Flexural strength VSM 77103 (kp./mm.$^2$) 5.3
Impact strength VSM 77105 (cm kp./cm.$^2$) 2.3
Volume resistance, dry, VDE 0303 (Ohm./cm.) 8.7 .10$^{14}$
Surface resistance, dry VDE 0303 (Ohm.) 5. 10$^{13}$

EXAMPLE 24

The following were kneaded for about 30 minutes in a double cavity kneader to give a homogeneous mixture: 168 g. of a bisphenol-A polyglycidyl ether which is liquid at room temperature, manufactured by condensation of epichlorhydrin with bisphenol A in the presence of alkali and having an epoxide content of 5.0 to 5.5 epoxide equivalents per kg. (=epoxy resin A), 99 g. of a bisphenol-A polyglycidyl ether which is solid at room temperature, manufactured by condensation of epichlorhydrin with bisphenol A in the presence of alkali and having an epoxide content of 1.7 to 1.9 epoxide equivalents per kg. (=epoxy resin B), 19 g. of a color paste consisting of 80 parts by weight of liquid bisphenol-A polyglycidyl ether (viscosity 9000–13,000 c.p. at 25° C, epoxide content 5.2 to 5.5 epoxide equivalents/kg.), 13 parts by weight of glycerine ester of hydrogenated colophony and seven parts by weight of Cu-phthalocyanine pigment (=color paste C), 101 g. of the adduct of 3,5,5-trimethyl-3-(aminomethyl)-cyclohexylamine and vinylcyclohexene diepoxide described in example 8, 15 g. of glycerine monostearate, 300 g. of calcined kaolin (registered trade name "Molochit") and 300 g. of 6 mm. long glass fibers. Thereafter the kneaded material was stored for about 24 hours at room temperature. The kneaded material became solid during that time and could be granulated.

The compression moulding composition thus obtained was pressed under the following conditions: Pressing temperature=165° C.; pressing pressure=12 kp./cm.$^2$; minimum pressing time=1½ minutes.

The pressed articles had the following properties: Dimensional heat stability according to Martens
DIN 53458 (°C.) 78
Flexural strength VSM 77103 (kp./mm.$^2$) 10.5
Impact strength VSM 77105 (cm kp/cm.$^2$) 5.5
Dielectric loss factor tg $\alpha$ at 20° C. (50 cycles/second) 1.13 . 10$^{-2}$
Volume resistance, dry (Ohm./cm.) 6.8 . 10$^{-15}$
Surface resistance, dry (Ohm.) 4 . 10$^{13}$

EXAMPLE 25

The following were kneaded for about 30 minutes in a double cavity kneader to give a homogeneous mixture: 161 g. of the liquid epoxy resin A used in example 24, 95 g. of the solid epoxy resin B used in the example 24, 19 g. of the color paste C used in example 24, 112 g. of the adduct of 3,5,5-trimethyl-3-(aminomethyl)-cyclohexylamine and the cycloaliphatic polyepoxide compound VII described in example 11, 15 g. of glycerine monostearate, 300 g. of calcined kaolin (registered trade name "Molochit") and 300 g. of 6 mm. long glass fibers. Thereafter the kneaded material was stored for about 24 hours at room temperature. During this time the kneaded material became solid and could be granulated.

The compression moulding composition thus obtained was pressed under the same pressing conditions as in example 24.

The pressed articles had the following properties: Dimensional heat stability according to Martens
DIN 53458 (°C.) 92
Flexural strength VSM 77103 (kp./cm.$^2$) 13.3
Impact strength VSM 77105 (cm kp./cm$^2$) 8.6
Dielectric loss factor tg. $\delta$ at 20° C. (50 cycles/second) 1.10.10.$^{-2}$
Volume resistance, dry (Ohm./cm.) 2.8.10$^{15}$
Surface resistance, dry (Ohm./cm.) 3.10$^{13}$
Tracking resistance VDE 0303 (level) KA 3c

EXAMPLE 26

The following were kneaded for about 30 minutes in a double cavity kneader to give a homogeneous mixture: 157 g. of the liquid epoxy resin A used in example 24, 92 g. of solid epoxy resin B used in example 24, 19 g. of the color paste C used in example 24, 119 g. of the adduct of 1,8-diamino-p-menthane and polyepoxide compound I described in example 17, 15 g. of glycerine monostearate, 300 g. of calcined kaolin (registered trade name "Molochit"), 300 g. of 6 mm. long glass fibers and 20 g. of resorcinol. Thereafter the kneaded material was stored for about 24 hours at room temperature. During this time the kneaded material became solid and could be granulated. The compression moulding composition thus obtained was pressed under the same pressing conditions as in example 24.

The pressed articles had the following properties: Dimensional heat stability according to Martens DIN 558 (°C.) 77
Loss factor tg δ at 20° C. (50 cycles/second) 0.80 . 10$^{-2}$
Volume resistance, dry (Ohm./cm.)    7.2 . 10$^{15}$
Volume after storage for 24 hours in H$_2$O (Ohm./cm.) 4.5 . 10$^{15}$
Surface resistance, dry (Ohm.)    5.2 . 10$^{13}$
Surface after storage for 24 hours in H$_2$O (Ohm.) 4.5 . 10$^{13}$

EXAMPLE 27

500 g. of an 80 percent strength solution of solid epoxide resin IV in glycol monoethyl ether/xylene, 3:1, are mixed with 100 g. of the adduct curing agent described in example 4, dissolved in 300 g. of methyl ethyl ketone/glycol monoethyl ether/xylene, 1:1:1, as well as with 30 g. of a levelling agent based on methylolurea etherified with butanol. This ready-to-use solution has a solid content of 57 percent and its pot life at room temperature is more than 60 hours. Practically colorless coatings of 30 λ dry film thickness manufactured therefrom showed very good levelling and a smooth surface, and at 20° C. and 65 percent atmospheric humidity the dust-dry time is 2 hours and the time for complete cure 7 hours. After one day, a Persoz pendulum hardness of 205, and after 7 days of 323, was measured. The Erichsen cupping values showed 7.5 mm. after 7 days at 20° C., and 9.0 mm. after 30 minutes on curing at 120°C.

EXAMPLE 28

133 g. of a 75 percent strength solution of solid epoxy resin IV in methl isobutyl ketone/xylene, 65:35, 200 g. of titanium dioxide (rutile), 57 g. of xylene/butanol, 1:1, and 10 g. of a levelling agent based on silicone are homogenized on a triple-roll mill. this white-pigmented resin component is mixed with a further 183 g. of a 75 percent strength solution of solid epoxy resin IV in methyl isobutyl ketone/xylene, 65:35, as well as with a solution of 63 g. of the adduct curing agent described in example 1 in 354 g. of xylene/butanol, 1:1. This ready-to-use white enamel having a solid content of 51 percent is applied as a spraying lacquer. The pot life is over 60 hours. White coatings manufactured therefrom, of 30 μ dry film thickness, show good levelling, the dust-dry time at 20° C. and 65 percent atmospheric humidity is 145 minutes and the time for complete cure 6 to 7 hours. A Persoz pendulum hardness of 100 was measured after one day and of 281 after 7 days. The Erichsen cupping values are 9 mm. after 7 days. A cure for 60 minutes at 80° C. yields a Persoz hardness of 315, and a cure for 30 minutes at 120° C. yields a Persoz hardness of 330.

EXAMPLE 29

595 g. of an 80 percent strength solution of solid epoxide resin IV in ethylene glycol monoethyl ether/xylene, 3:1, are mixed with 100 g. of the adduct curing agent described in example 20, dissolved in 150 g. of ethylene glycol monoethyl ethyl/xylene, 1:1, as well as with 30 g. of a levelling agent based on methylolurea etherified with butanol. This ready-to-use solution has a solid content of about 70 percent and at room temperature the pot life is over 60 hours.

Practically colorless coatings of 30 μ dry film thickness manufactured therefrom showed very good levelling and a smooth surface; at 20° C. and 65 percent atmospheric humidity the dust dry time is 1½ hours and the time for complete cure 6 hours. A Persoz pendulum hardness of 240 was measured after one day and of 360 after 7 days. The Erichsen cupping values show 8 mm. after 7 days at 20° C.; on curing at 120° C., 9.6 mm. after 30 minutes.

We claim:

1. An adduct which is suitable as curing agent for 1,2-polyepoxy resin, said adduct being prepared by heating a blend of (1) a 1,2-polyepoxide compound and (2) a cycloaliphatic-aliphatic diprimary diamine in which the first primary amino group is located on an aliphatic side-chain and the second primary amino group is bonded to an endocyclic carbon atom of the cycloaliphatic ring, with the proviso that in the blend used for the adduct formation 0.6 to 1.2 mol of the diamine (2) are present for one epoxide group equivalent of the polyglycidyl compound (1).

2. An adduct according to claim 1, wherein the diamine (2) used in the adduct formation is a 1,8-diamino-p-methane.

3. An adduct according to claim 1, where the diamine (2) used in the adduct formation is a member selected from the group consisting of 3-aminomethyl-3,5,5-trimethylcyclo-hexylamine and 2-aminomethyl-cyclopentylamine.

4. An adduct according to claim 1, wherein the 1,2-polyepoxide compound (1) used in the adduct formation is an alicyclic polyepoxide.

5. An adduct according to claim 1, wherein the 1,2-polyepoxide compound (1) used in the adduct formation is a polyglycidyl ether of a polyphenol.

6. An adduct according to claim 1 which is formed from a blend where about 0.7 to 1.0 mol of the diamine (2) is present for one epoxide group equivalent of the polyepoxide compound (1).

7. An adduct according to claim 1 which is formed by heating a blend of (1) a 1,2-polyepoxide compound and (2) a cycloaliphatic-aliphatic diprimary diamine in the temperature range of 60° to 180° C.

8. A curable composition of matter which comprises (a) a 1,2-polyepoxy resin and (b) as curing agent an adduct prepared by heating a blend of (1) a 1,2-polyepoxide compound and (2) a cycloaliphatic-aliphatic diprimary diamine in which the first primary amino group is located on an aliphatic side-chain and the second primary amino group is bonded to an endocyclic carbon atom of the cycloaliphatic ring, with the proviso that in the blend used for the adduct formation 0.6 to 1.2 mol of the diamine (2) are present for one epoxide group equivalent of the polyglycidyl compound (1).

9. A curable composition according to claim 8 which contains as further ingredient a member selected from the group consisting of a monophenol and a polyphenol as a curing accelerator.

10. A storage-stable single component system capable of curing by forming moulding compositions, which comprises (a) an 1,2-polyepoxy resin and (b) as curing agent an adduct prepared by heating a blend of (1) a 1,2-polyepoxide compound and (2) a cycloaliphatic-aliphatic diprimary diamine in which the first primary amino group is located on an aliphatic side-chain and the second primary amino group is bonded to an endocyclic carbon atom of the cycloaliphatic ring, with the proviso that in the blend used for the adduct formation 0.6 to 1.2 mol of the diamine (2) are present for one epoxide group equivalent of the polyglycidyl compound (1).

* * * * *